United States Patent
Getzlaff et al.

[11] Patent Number: 5,898,867
[45] Date of Patent: Apr. 27, 1999

[54] HIERARCHICAL MEMORY SYSTEM FOR MICROCODE AND MEANS FOR CORRECTING ERRORS IN THE MICROCODE

[75] Inventors: Klaus Joerg Getzlaff, Schoenaich, Germany; Johann Hajdu, deceased, late of Boeblingen, Germany, by Anna Hajdu, executrix; Brigitte Roethe, Boeblingen; Udo Wille, Holzgerlingen, both of Germany

[73] Assignee: International Business Machines Corporation, Armonk, N.Y.

[21] Appl. No.: 08/132,410

[22] Filed: Oct. 6, 1993

[30] Foreign Application Priority Data

Oct. 7, 1992 [EP] European Pat. Off. .............. 92117101

[51] Int. Cl.⁶ ........................................... G06F 9/24
[52] U.S. Cl. ............................ 395/598; 395/568; 395/595
[58] Field of Search ..................................... 395/325, 375, 395/575, 700, 775, 595, 598, 183.11, 185.01, 568, 571, 590; 371/10.1, 12, 60

[56] References Cited

U.S. PATENT DOCUMENTS

| | | | |
|---|---|---|---|
| 3,959,783 | 5/1976 | Fressineau et al. | 365/200 |
| 4,204,252 | 5/1980 | Hitz et al. | 395/598 |
| 4,231,089 | 10/1980 | Lewine et al. | 395/182.05 |
| 4,356,550 | 10/1982 | Katzman et al. | 395/182.12 |
| 4,422,144 | 12/1983 | Johnson et al. | 395/598 |
| 4,538,265 | 8/1985 | Day et al. | 395/182.15 |
| 4,799,145 | 1/1989 | Goss et al. | 395/651 |
| 4,800,563 | 1/1989 | Itagaki et al. | 395/182.04 |
| 4,823,252 | 4/1989 | Horst et al. | 395/182.05 |
| 4,884,195 | 11/1989 | Endo | 395/308 |
| 4,920,479 | 4/1990 | Hashiguchi | 395/181 |
| 4,955,023 | 9/1990 | Tamimoto | 371/40.1 |
| 5,144,242 | 9/1992 | Zeilenga et al. | 324/312 |
| 5,155,843 | 10/1992 | Stamm et al. | 395/182.03 |
| 5,173,905 | 12/1992 | Parkinson et al. | 371/40.13 |
| 5,210,758 | 5/1993 | Gomez | 395/182.04 |
| 5,241,547 | 8/1993 | Kim | 395/182.06 |
| 5,257,380 | 10/1993 | Lang | 711/166 |
| 5,347,638 | 9/1994 | Desai et al. | 395/825 |

FOREIGN PATENT DOCUMENTS 0105710 4/1984 European Pat. Off. .
0178670 4/1986 European Pat. Off. .

*Primary Examiner*—Parshotam S. Lall
*Assistant Examiner*—Viet Vu
*Attorney, Agent, or Firm*—Arthur J. Samodovitz

[57] ABSTRACT

A multiprocessor computer system includes a system clock, a main memory connected through a memory bus to a microinstruction memory and a microinstruction decoder. Circuitry detects whether the microinstruction being decoded is the wrong microinstruction or has a parity error. On detection of such an erroneous microinstruction, the microinstruction is reloaded from the main memory into the microinstruction memory and then passed to the microinstruction decoder without interrupting the system clock or operation of the other processors.

10 Claims, 3 Drawing Sheets

HIERARCHICAL MEMORY SYSTEM FOR MICROCODE AND MEANS FOR CORRECTING ERRORS IN THE MICROCODE

BACKGROUND OF THE INVENTION

The invention relates generally to multiprocessor computer systems and deals more particularly with detection of errors in microinstructions fetched from main memory and in the case of error, reloading the proper microinstruction without interrupting operation of the other processors.

The problem of ensuring that a microinstruction word to be executed by a processing unit is valid is one of the most important considerations when designing a processing system. If the microinstruction to be executed is invalid, then the processing unit will not be able to execute it and may stop functioning. The problem is particularly acute in systems with multiple processing units such as the IBM/390 systems since if one of the processing units stops working because it is trying to execute an invalid instruction, then data may be lost and the integrity of the data required by the other processing units cannot be guaranteed.

The problem is becoming particularly acute as the on-chip memories in which the microinstructions are stored become smaller. Even though shielding is incorporated into such memories, the loss of data due to alpha particles changing the value of some bits in the memory (so-called "soft errors") has to be considered by the designers of processing systems.

One well known method in the prior art for ensuring the validity of a microinstruction is to add a parity bit to the microinstruction. Before the microinstruction is executed, its parity is checked and, if it is found to be incorrect, remedial action is carried out.

U.S. Pat. No. 4,231,089 describes one type of remedial action that may be carried out. In this document a method and apparatus is disclosed which enables an erroneous microinstruction to be rewritten before it is executed. In the described system, the microinstruction is first written from memory into a control register. A parity network coupled to the control register determines whether a valid microinstruction is being executed. If this is not the case, then the clock pulses to the data paths coupled to the control register are inhibited and a clock stop recovery is carried out. The original microinstruction is fetched from secondary storage, such as tape or disc, and rewritten into the microinstruction memory. After rewriting the microinstruction memory, the signal inhibiting the clock pulses is removed, thereby allowing the rewritten microinstruction to be executed.

The processing system disclosed in U.S. Pat. No. 4,231,089 comprises a single processor and thus stopping the clock in order to reload the microinstruction will not affect the operation of any further processors. In a multi-processor system, however, in which every processor has its own cache (or even several caches in a hierarchical system), the effect of stopping the clock of one processor could be catastrophic. The system could no longer be certain of the integrity of the data in the main memory, since data from the cache memories associated with the stopped processor will not be transferred back to the main memory and the validity bits associated with the lines of data in the cache memories will not be set or reset. There is a risk therefore that customer data will be lost which could cause severe problems for the user of the processing system. One example in which the loss of data would have serious consequences is the use of such a processor in a bank cash dispensing system.

In addition to the loss of integrity of the data, the time required to restart the processor may be significant. When the clock in one of the processing units is stopped, then the processing unit would have to be restarted using a service processor. This may take several seconds, a time period which is unacceptable for many applications. Furthermore, peripheral units such as input/output subsystems and channels connected to the processor may be timed out if the clock in one of the processing units is stopped. The peripheral units may also need to be restarted, further delaying the restart of the system.

One means of overcoming these problems would be to add error correcting and checking bits to the microinstruction. This would allow an error checking and recovery mechanism to be built into the processing system to check the microinstruction before it was executed and, if an error was detected, to correct it. Such a system, however, would require larger memories to be constructed to store both the microinstruction and its associated check bits. In addition the execution of an invalid microinstruction would be delayed whilst it was corrected.

U.S. Pat. No. 4,901,228 teaches a pipelined cache system which uses back up address registers for providing error recovery while continuing pipeline processing. The cache memory includes an address back-up register which stores the physical address of the data in which an error is detected and backs-up the address register. The cache memory further includes a data array address back-up register which stores the data address of the data in which errors are generated and backs up the data array address register. The cache memory also includes a request code back-up register which stores a preceding request code at the time that the errors are generated. When an error is detected by the system controller, data is read from the main memory according to the back-up registers and other registers of the system controller.

The pipelined cache system taught in this patent has the disadvantage that it requires a large number of back-up registers plus accompanying circuitry for ensuring that the registers are backed-up correctly. This adds to the complexity of the system and the space required on the chip.

The pipelined cache system also has the disadvantage that it requires two cycles in order to generate the signal indicating that an error has been detected. In memory systems such as those used in the low end IBM/390 machines only one cycle is required for obtaining data from a cache memory and thus a signal indicating an error in the data must be generated in the same cycle. Using the teachings of U.S. Pat. No. 4,901,228 this is not possible.

From EP-A-0 178 670 is known a system for providing microinstruction read error detection and recovery by permitting the unchecked microinstruction to be executed in parallel with microinstruction read error detection. The microinstruction execution is aborted upon detection of an error prior to making any change in the state of the system which would prevent the retrying of the microinstruction after it is read again from memory. Because the reading of the next microinstruction is initiated during the execution of the current microinstruction whose validity is checked in parallel with its execution, the system provides for the discarding of the next microinstruction prior to retrying the current microinstruction by rereading the current microinstruction followed by re-execution of the current microinstruction. While the current microinstruction is being re-executed, the rereading of the next microinstruction is initiated so that it will be available for execution following the re-execution of the current microinstruction. The disclosed system does not, however, teach a method for recovery should the microinstruction in the control store be in error.

The object of the invention is to design a system and method for correcting microinstructions which overcomes the disadvantages of the prior art systems.

SUMMARY OF THE INVENTION

The object is solved by providing a system in which, on detection of erroneous microinstructions, means are provided whilst the microinstructions are being loaded to inhibit the execution of the erroneous microinstruction after decoding in said microinstruction decoder without stopping the system clock.

In one embodiment of the invention, the secondary memory of the hierarchical memory system is divided into an area for storing performance critical microinstructions containing microinstructions permanently stored in said secondary memory and an area for storing transient microinstructions which may be paged into said secondary memory from said main memory as required. The secondary memory is preferably random access memory embedded on the same chip as the microprocessor.

The means to detect an error in the microinstruction being decoded may comprise either means to check the parity of the microinstruction or means to detect that the microinstruction to be decoded is present in an area of the secondary memory for storing transient microinstructions.

The hierarchical memory system is particularly suitable for use in a multi-processor system wherein with each processor is associated one secondary memory and with one main memory provided for the multi-processor system.

The invention also includes a method for correcting errors in microinstructions stored in a secondary memory with a back-up copy in a main memory comprises the following steps:
  a) passing microinstruction to be executed from the secondary memory to a microinstruction decoder;
  b) checking the microinstruction in the microinstruction decoder;
  c) on detection of an error in the microinstruction decoder performing the following steps:
    ci) generating a signal to set a latch to prevent the execution of the erroneous microinstruction;
    cii) reloading the microinstruction from the main memory into the secondary memory;
    ciii) passing the reloaded microinstruction from the secondary memory to the microinstruction decoder;
    civ) resetting the latch
    cv) returning to step c);
  d) if no error is detected then executing the decoded microinstruction.

The step of detecting an error in the microinstruction may comprise either detecting an error in the parity of the microinstruction or detecting that the wrong microinstruction is to be executed. The step of detecting that the wrong microinstruction is to be executed comprises: determining in which microcode page the microinstruction is to be found and determining whether said microcode page is present in a transient microcode buffer in the secondary memory.

The step of reloading the microinstruction from the main memory into the secondary memory comprises: passing the address of the erroneous microinstruction from a microprogram counter to an adder; adding the erroneous microinstruction address in the adder to the start address of the microprogram in the main memory to obtain the corresponding address of the microinstruction in the main memory; passing the main memory microinstruction address from the adder to the main memory via a memory bus; fetching the microinstruction at the address addressed by the main memory microinstruction address; passing the fetched microinstruction from the main memory to the secondary memory along the memory bus; and storing the fetched microinstruction in the secondary memory at the location from which the erroneous microinstruction was stored.

In one embodiment of the invention, the step of passing the reloaded microinstruction from the secondary memory to the microinstruction decoder comprises: storing the value of the address in the microprogram counter at which the erroneous microinstruction was found in a microprogram counter buffer; and, after reloading of the microinstruction, passing the value of the address from the microprogram counter buffer to the microprogram counter; fetching the microinstruction at the address given by the microprogram counter buffer; and passing the addressed microinstruction from the secondary memory to the microinstruction decoder.

The invention, as described herein, has the advantage over the known prior art systems in that it allows for recovery from an error condition in one processor without it being necessary to stop the system clock. In a multiprocessor system this is particularly advantageous since it allows the other unaffected processors to continue with their current actions without having to cease execution.

The described invention furthermore ensures that data in cache memories is not rendered unreliable because one processor has stopped functioning. The data to be written back into the main memory is preserved until the processor starts functioning again and all validity bits remain set to their correct value.

The division of the microinstructions into performance critical and transient microinstruction and the resulting division of the secondary or microinstruction memory into two portions allows for much larger microprograms without increasing the size of the embedded memory on the chip. The described invention teaches how the transient or less performance critical microinstructions are fetched from the main memory into the secondary memory as required.

DETAILED DESCRIPTION OF THE INVENTION

Figure 1:
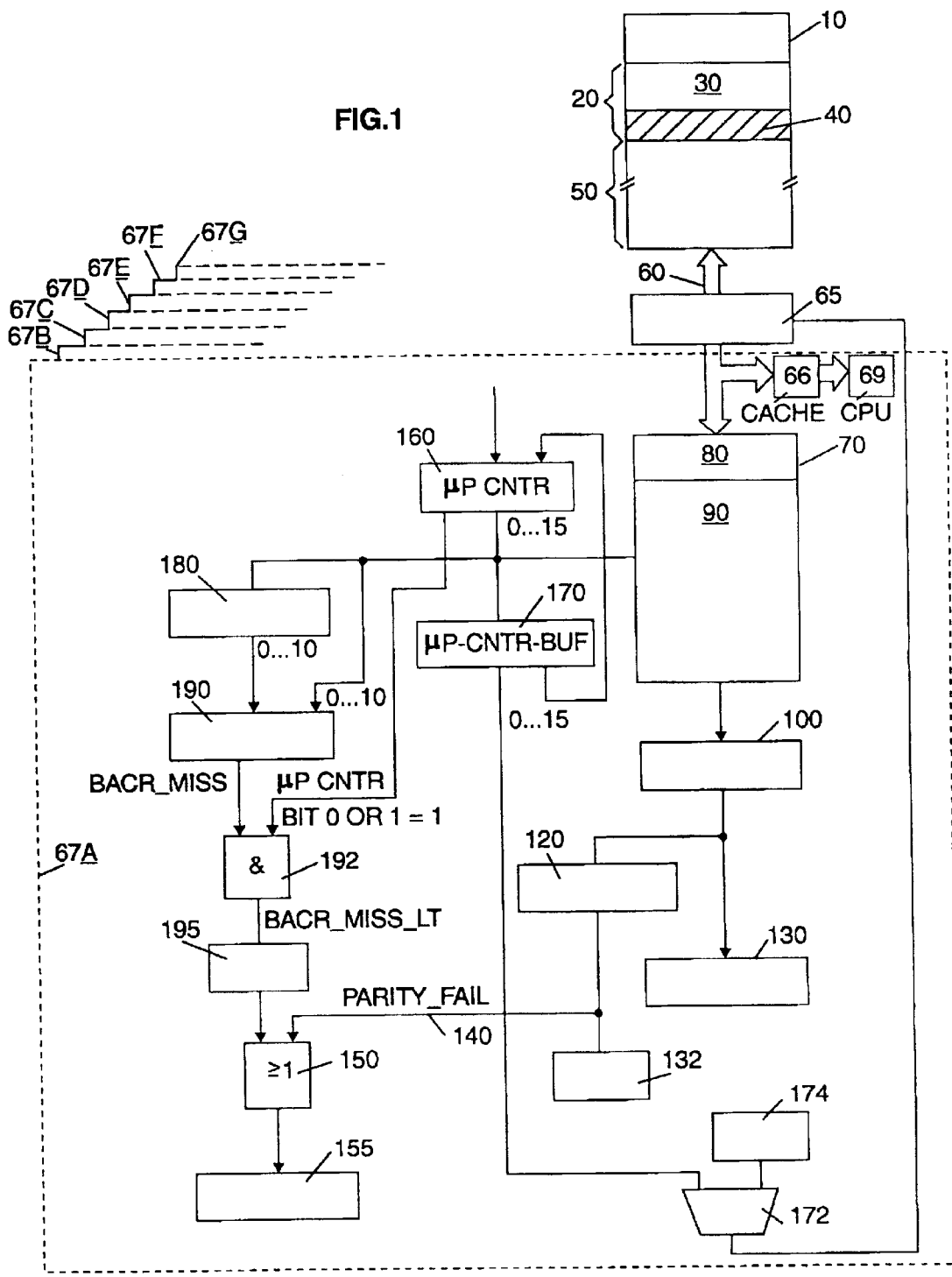
FIG. 1 shows an overview of the invention

FIG. 1 shows an overview of the invention. It comprises a main memory 10 which is divided into a microcode storage area 20 and a customer program storage area 50. The microcode storage area 20 is further divided into a transient microcode storage area 30 and a performance critical microcode storage area 40. The performance critical microcode storage area 40 contains the microinstructions which are critical to the performance of the processor. In the preferred embodiment it contains 16K microinstruction words (i.e. 16K×2 bytes). The transient microcode storage area 30 contains the microcode that is less critical to the performance of the processor. In the preferred embodiment it contains 48K microinstruction words (48K×2 bytes).

The main memory 10 is connected through a memory bus 60 and a cache register 65 to a microinstruction memory 70 and also to a cache memory 66 of a central processor unit (CPU) 69. In the preferred embodiment the main memory 10 is connected through the memory bus 60 to seven processors 67a–g and thus seven microinstruction memories 70, seven cache memories 66 and seven CPUs 69. However, for simplicity only one microinstruction memory 70 is depicted. In the preferred embodiment of the invention the microinstruction memory 70 is an embedded array of random access memory.

The microinstruction memory 70 is divided into two areas. A transient microinstruction buffer 80 stores microcode that is less critical to the performance of the processor. It contains, in the preferred embodiment, 64 bytes (i.e. one page) of microinstructions. A performance critical microinstruction storage area 90 stores microcode that is critical to the performance of the processor. In the preferred embodiment it stores 16K×2 bytes of microinstructions.

The performance critical microinstruction storage area 90 of the microinstruction memory 70 is the same size as the performance critical microcode storage area 40 of the main memory 10. On power up of the processor, a copy of the microcode stored in the performance critical microcode storage area 40 is loaded from the main memory 10 into the performance critical microinstruction storage area 90 of the microinstruction memory 70. The transient microinstruction buffer 80 of the microinstruction memory 70 is much smaller than the transient microcode storage area 30 of the main memory 10. Since it contains only microinstructions which are less critical to the performance of the processor, the microinstructions can be paged into the transient microinstruction buffer 80 as required and explained below.

The output of the microinstruction memory 70 is connected to a microinstruction register 100 which is in turn connected to an instruction decoder 130. A parity checker 120 is connected to the microinstruction register 100 to check the parity of the microinstruction passed to the microinstruction register 130. In the event of failure of the parity, a parity fail signal, PARITY_fail, is sent along line 140 to an OR gate 150 and to a latch 132. Setting of the latch 132 ensures that the microinstruction in the microinstruction register 130 is not executed.

The output of the OR gate 150 is connected to a microcode loading mechanism 155. The microcode loading mechanism 155 is not shown in detail in FIG. 1. It is the means by which microinstructions are loaded from the main memory 10 into the microinstruction memory 70. As mentioned above, it is used to load the performance critical microinstructions from the performance critical microcode storage area 40 into the performance critical microinstruction storage 90 on power up. It is also used to page less performance critical microinstructions from the transient microcode storage area 30 to the transient microinstruction buffer 80 as and when required. It can be further used to reload microinstructions from the main memory 10 into the microinstruction memory 70 should a parity error in the microinstruction be detected.

The microinstruction memory 70 is addressed by a microprogram counter 160. The microprogram counter 160 in the preferred embodiment is a 16 bit counter. 64K microinstruction words can be addressed in total, of which in the preferred embodiment, 16K are found in the performance critical microcode storage 90 of the microinstruction memory 70 and 64 bytes in the transient microinstruction buffer 90 of the microinstruction memory 70. All 64K microinstruction words are found in the main memory 10.

The microprogram counter 160 is connected to a microprogram counter buffer 170 which is in turn connected to an adder 172. The adder 172 adds the value of the microprogram counter buffer 170 to the value in a register 174 which indicates the start address of the microcode storage area 20 above the customer program storage area 50 in the main memory 10. The output of the adder 172 is connected to the memory bus 60 and is then used to address the main memory 10 if the microcode loading mechanism 155 is activated. The output of the microprogram counter buffer 170 is connected to the microprogram counter 160 so that the microprogram counter 160 may be reloaded with the current address of the microprogram if required.

As mentioned above, the upper 64 bytes of the microinstruction memory 70 (i.e. 32 addresses) comprises transient microcode that can be paged into the microinstruction memory 70. A buffer address compare register (BACR) 180 stores the address of the microcode page currently in the transient microcode buffer 80. This address is compared with the address of the microcode page currently being addressed by the microprogram counter 160 (i.e. bits 0 to 10 of the address) in a comparator 190. In the event of a comparison failure (i.e. the microcode page being addressed is not in the transient microinstruction buffer 80), a signal, BACR_miss is generated. This signal is passed to an AND gate 192 whose other input is the value of the bit 0 or bit 1 of the address in the microprogram counter 160. If the value of bit 0 or bit 1 is 1, then the microinstruction being addressed can be found in the main memory 10 and the AND gate 192 produces a signal BACR_miss_LT. The BACR_miss_LT signal is passed to a latch 195 and to the OR gate 150 and thence initiates the microcode loading mechanism 155 as described above. Setting of the latch 195 by the signal BACR_miss_LT ensures that the currently addressed microinstruction in the instruction decoder 130 is not executed.

Figure 2:
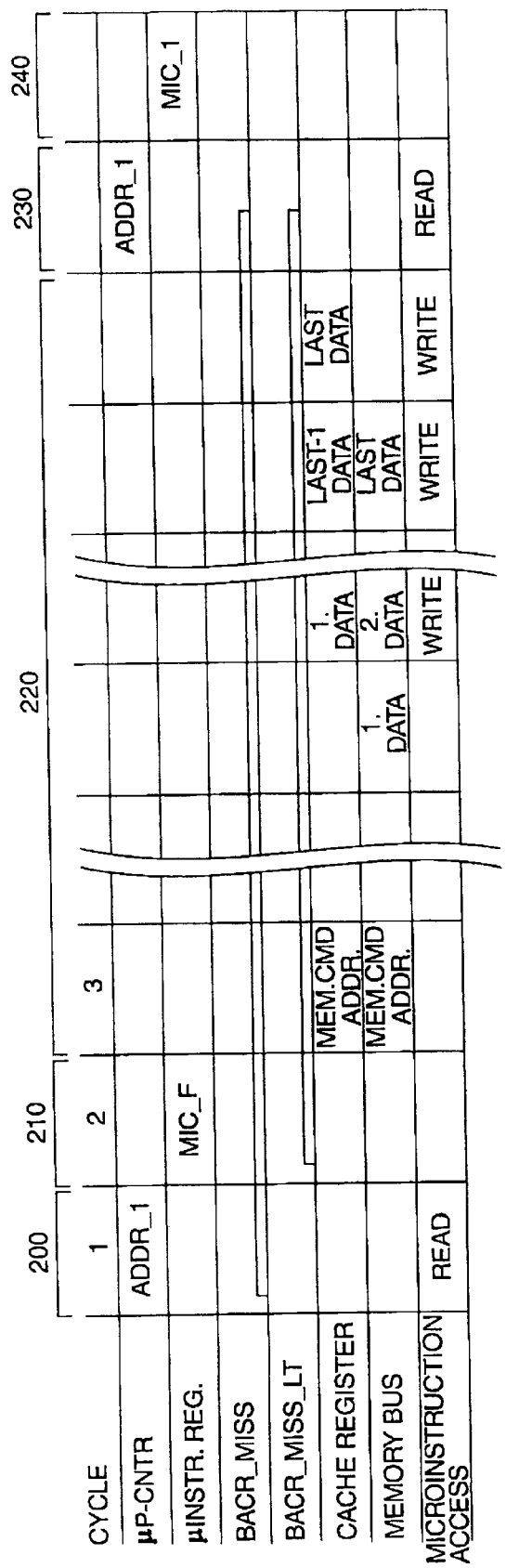
FIG. 2 shows a timing diagram for the paging of microinstructions from the microcode storage area to the microinstruction memory.

A description of the paging of microinstructions from the transient microcode storage area of the main memory 10 into the transient microinstruction buffer 80 of the microinstruction memory 70 now follows with the help of FIG. 2. For the purposes of illustration, it is assumed that the next microinstruction MIC_1 to be executed is one of the microcode instructions stored in the transient microcode storage area 30 of the main memory 10 at ADDR_1 but that this microinstruction MIC_1 is not stored in the transient microinstruction buffer 80 of the microinstruction memory 70. Instead, at the place where the microinstruction MIC_1 would be stored in the transient microinstruction buffer 80, another microinstruction MIC_F from another microcode page is stored.

In the first cycle 200, the access method of the microinstruction memory 70 is set to read and the address in the microinstruction memory 70 corresponding to ADDR_1 calculated (i.e. the location at which it would be expected that the microinstruction MIC_1 would appear). In the same cycle 200 a comparison is carried out in the comparator 190 to determine, using the buffer address compare register, whether the microcode page including the address ADDR_1 (and hence the microinstruction MIC_1) is present in the transient microinstruction buffer 80. Since—as was assumed above—this is not the case the BACR miss signal goes high.

In the second cycle 210, the microinstruction MIC_F from the addressed location within the transient microinstruction buffer 80 is loaded into the microinstruction register 100. In this cycle 210, the BACR_miss signal is ANDed with the value of bit 0 or bit 1 of ADDR_1. Since it is known that the microinstruction MIC_1 is in the microcode storage area 20 of the main memory 10, the address ADDR_1 will have one or both of bits 0 or 1 equal to 1 and thus a high signal BACR_miss_LT will appear at the output of the AND gate 200.

The effect of the high BACR_miss_LT signal is initiate the microcode loading mechanism 155 and to set the latch 195. The address (MEM.CMD.ADDR.) at which the microinstruction is to be found in the main memory 10 is fetched from the adder 172, passed to the cache register 65 and placed on the memory bus 60. From here the address is passed to the main memory 10 and a microcode page loading operation commenced. The microcode instructions contained in the addressed page are found in the transient microcode storage area 30. The microinstructions are read from the transient microcode storage area 30 of the main memory 10 onto the memory bus 60 from whence they are read after one cycle into the cache register 65. The microinstruction memory 70 is set to write mode and the microinstructions read into it. These steps are shown as the block 220 on FIG. 2. The number of machine cycles required before data is onto the memory bus 65 and the number of machine cycles required before the transient microcode is paged from the main memory 10 to the microinstruction memory 70 depends on the design of the main memory 10 and the width of the memory bus 65. Typically the combined step will take between 16 and 20 cycles.

Whilst the transient microcode loading process is being carried out, the microprogram counter 160 will be stepping through various addresses (not shown). However, as the latch 195 has been set, the microinstructions loaded into the microinstruction register 100 will not be executed. When the complete transient code page has been loaded into the transient microinstruction buffer 80 from the transient microcode storage area 30, the address ADDR_1 is passed from the microprogram counter buffer 170 to the microprogram counter 160 as shown in step 230 on FIG. 2. In the same cycle, the mode of operation of the microinstruction memory 70 is switched to READ. In the following cycle 240 the correct microinstruction MIC_1 is then read from the transient microinstruction buffer 90 of the microinstruction memory 70. The value in the buffer address compare register 180 has been updated to indicate the page of the microcode currently in the transient microinstruction buffer. Thus the comparator 190 will no longer produce a BACR_miss signal and hence no BACR_miss_LT signal will be produced to set the latch 195 and stop the execution of the microinstruction after decoding in the microinstruction decoder 130.

Figure 3:
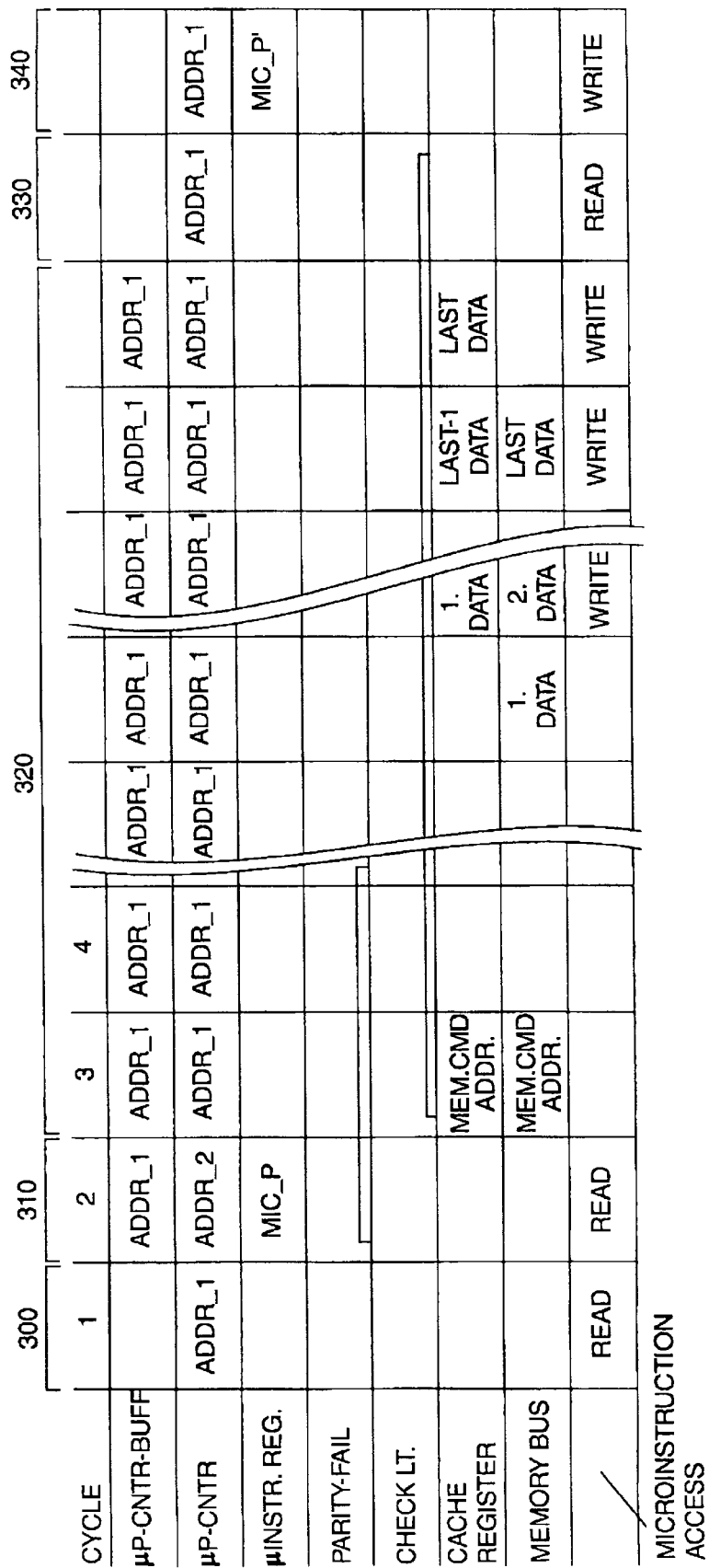
FIG. 3 shows a timing diagram for the detection of parity errors of microinstructions and reloading the microinstructions from the main memory to the microinstruction memory.

The reloading of a microinstruction whose parity is found to be incorrect is shown with the aid of FIG. 3. In the first cycle 300 the microprogram counter 160 contains the address ADDR_1 in the microinstruction memory 70 from which the next microinstruction MIC_P is to be read. The access mode of the microinstruction memory 70 is set to read.

In the second cycle 310, the microinstruction MIC_P is read from the microinstruction memory 70 into the microinstruction register 100. The microprogram counter 120 contains the address ADDR_2 in the microinstruction memory 70 from which it would be expected that the next microinstruction would be read. The previous address from the microprogram counter 120, i.e. ADDR_1, has been passed to the microprogram counter buffer 170. In the parity checker 120, the parity of the microinstruction MIC_P is checked and, if it is found to be incorrect, a signal PARITY_fail is issued. Naturally if the parity is correct no PARITY_fail signal is issued.

The effect of issuing the PARITY_fail signal is to set the latch 132 which prevents the execution of the microinstruction MIC_P after being decoded in the microinstruction decoder 130 and causes the address ADDR_1 stored in the microprogram counter buffer 170 to be reloaded into the microprogram counter 160. The PARITY_fail signal also initiates the microcode reloading mechanism 155.

The process of reloading the microcode page containing the microinstruction MIC_P whose parity was found to be incorrect is essentially the same as that for loading the less performance critical microcode from the transient microcode storage area 30 to the transient microinstruction buffer 80. It should be noted, however, that the parity is checked for all microinstructions, whether they are stored in the transient microinstruction buffer 80 or the performance critical microinstruction storage 90. Thus the microinstructions can be reloaded from either the transient microcode storage area 30 or the performance critical microcode storage area 40 of the main memory 10.

The address (MEM.CMD.ADDR.) at which the microinstruction with the correct parity should to be found in the main memory 10 is fetched from the adder 172 and placed into the cache register 65 and then onto the memory bus 60. From here the address is passed to the main memory 10 and a microcode page loading operation commenced. The microcode instructions contained in the addressed page are found in the microcode storage area 20. The microinstructions are read from the microcode storage area 20 of the main memory 10 onto the memory bus 60 from whence they are read after one cycle into the cache register 65. The microinstruction memory 70 is set to write mode and the microinstructions read into it. These steps are shown as the block 320 on FIG. 3. The number of machine cycles required before data is onto the memory bus 65 and the number of machine cycles required before the transient microcode is paged from the main memory 10 to the microinstruction memory 70 depends on the design of the main memory 10 and the width of the memory bus 65. Typically the combined step will take between 16 and 20 cycles.

Whilst the microcode reloading process is being carried out, the microprogram counter 160 will be stepping through various addresses (not shown). However, the presence of the set latch 132 ensures that the microinstructions loaded into the microinstruction register 100 will not be executed. Prior to the microcode reloading process, the address ADDR_1 is passed from the microprogram counter buffer 170 to the microprogram counter 160 as shown in step 310 on FIG. 3. The mode of operation of the microinstruction memory 70 is switched to READ, when the complete microcode page has been loaded into the transient microinstruction buffer 80.

In the following cycle (step 330) the microinstruction MIC_P' is read from the microinstruction memory 70. The parity of the microinstruction MIC_P' is checked in the parity checker 120 and, if it is correct, no PARITY_fail signal is issued and the latch 132 is reset. The microinstruction MIC_P' is decoded by the microinstruction decoder 130 and executed.

It is, of course, possible that the parity of the microinstruction stored in the main memory 10 is incorrect and thus simply reloading the microinstruction from the microcode storage area 20 into the microinstruction memory 70 will not serve any purpose. The chances of this situation occurring are, however, much smaller than the chance that the parity of the microinstruction in the microinstruction memory 70 is incorrect. Thus several attempts can be made to reload the microinstruction before other corrective action needs to be taken. The number of times that reloading of microinstructions is attempted depends on the design of the chip.

We claim:

1. A computer system for executing microinstructions, said system comprising:

a processor;

a first buffer for storing a plurality of blocks of transient microinstructions;

a second buffer for storing a plurality of blocks of microinstructions which are loaded at power up and remain loaded except if erroneously loaded;

means for directing said processor to execute microinstructions in order and determining when a next microinstruction to be executed is not stored in said first or second buffers;

means, coupled to the determining means, for loading another block containing said next microinstruction into said first buffer; and means for detecting when a microinstruction to be executed from either said first or second buffers is erroneous, avoiding execution of said erroneous microinstruction, activating the loading means to re-load a block containing a valid version of said erroneous microinstruction into said first or second buffer, respectively, and causing the directing means to direct said processor to execute said valid version microinstruction.

2. A computer system as set forth in claim 1 wherein said loading means utilizes the same mechanism to load said other block as to re-load the block containing said valid version microinstruction.

3. A computer system as set forth in claim 2 further comprising means for determining which block contains said next microinstruction and which block contains said valid version microinstruction and providing an identification of said block which contains said next instruction and an identification of said block which contains said valid version microinstruction to said loading means.

4. A computer system as set forth in claim 2 further comprising an OR gate having a first input coupled to receive a signal from the determining means indicating whether said next instruction is stored in said first or second buffers and a second input coupled to receive a signal from the detecting means indicating whether a microinstruction to be executed is erroneous and an output coupled to activate said loading means.

5. A computer system as set forth in claim 3 further comprising an OR gate having a first input coupled to receive a signal from the determining means indicating whether said next instruction is stored in said first or second buffers and a second input coupled to receive a signal from the detecting means indicating whether a microinstruction to be executed is erroneous and an output coupled to activate said loading means.

6. A computer system as set forth in claim 1 wherein said detecting means comprises a parity checker.

7. A computer system as set forth in claim 1 further comprising:

a second processor;

a third buffer for storing a plurality of blocks of transient microinstructions;

a fourth buffer for storing a plurality of blocks of microinstructions which are loaded at power up and remain loaded except if erroneously loaded;

means for directing said second processor to execute microinstructions in order and determining when a next microinstruction to be executed is not stored in said third and fourth buffers;

means, coupled to the determining means, for loading another block containing said next microinstruction into said third buffer;

means for detecting when a microinstruction to be executed from either said third or fourth buffers is erroneous, avoiding execution of said erroneous microinstruction, activating the loading means to re-load a block containing a valid version of said erroneous microinstruction into said third or fourth buffer, respectively, and causing the directing means to direct said second processor to execute the valid version microinstruction; and a main memory shared by both of said processors to store all of the microinstructions loaded into said first, second, third and fourth buffers.

8. A computer system as set forth in claim 1 further comprising means for decoding said instructions to be executed and wherein the detecting means determines if a microinstruction to be executed is erroneous en route from said first or second buffer containing said microinstruction to be executed to the decoding means.

9. A computer system as set forth in claim 1 wherein the loading means comprises:

means for passing an address of the erroneous microinstruction from a microprogram counter to an adder;

means for adding the erroneous microinstruction address in the adder to a start address of a microprogram in a main memory to obtain the corresponding address of the microinstruction in the main memory;

means for passing the main memory microinstruction address from the adder to the main memory;

means for fetching the microinstruction at the main memory microinstruction address; and means for passing the fetched microinstruction from the main memory to said first or second buffer containing the erroneous microinstruction and overwriting the erroneous microinstruction.

10. A computer system as set forth in claim 1 wherein the causing means comprises:

means for storing an address in a microprogram counter of the erroneous microinstruction; and means, active after re-loading of the block containing the valid version microinstruction, for passing the address from the microprogram counter storing means to the microprogram counter;

means for fetching the microinstruction at the address given by the microprogram counter storing means; and means for passing the addressed microinstruction from one of the buffers to a microinstruction decoder.

* * * * *